United States Patent [19]

Hayashi et al.

[11] Patent Number: 5,694,411
[45] Date of Patent: Dec. 2, 1997

[54] ULTRAVIOLET RANGE LASER AND METHOD FOR MANUFACTURING THE SAME

[75] Inventors: Toshiharu Hayashi, Yokohama; Hiroto Urakata, Nishinasuno-machi; Hironori Nakamuta, Otawara; Eiichiro Otsuki, Nishinasunomachi; Koji Inamoto, Otawara, all of Japan

[73] Assignee: Kabushiki Kaisha Toshiba, Kawasaki, Japan

[21] Appl. No.: 759,686

[22] Filed: Dec. 6, 1996

Related U.S. Application Data

[63] Contionuation of PCT/JP96/00394, Apr. 5, 1996, abandoned.

[30] Foreign Application Priority Data

Apr. 7, 1995 [JP] Japan .................................. 7-082537
Mar. 15, 1996 [JP] Japan .................................. 8-059517

[51] Int. Cl.$^6$ .................................. H01S 3/22; B23K 9/00
[52] U.S. Cl. .................................. 372/57; 372/55; 372/61;
372/65; 372/87; 219/85.1; 219/85.22; 219/59.1
[58] Field of Search .................................. 372/55, 57, 59,
372/61, 64, 65, 81, 85, 87, 88; 219/78.01,
85.1, 85.2, 85.22, 59.1

[56] References Cited

U.S. PATENT DOCUMENTS

| 4,295,104 | 10/1981 | Burnham | 372/55 X |
| 4,727,638 | 3/1988 | Altmann et al. | 29/417 |
| 4,817,096 | 3/1989 | Nighan et al. | 372/5 |
| 4,817,107 | 3/1989 | Hsia | 372/61 |
| 4,823,354 | 4/1989 | Znotins et al. | 372/57 |
| 4,875,220 | 10/1989 | Krueger et al. | 372/107 |
| 5,034,959 | 7/1991 | Welsch | 372/65 |
| 5,239,551 | 8/1993 | Roberts et al. | 372/57 |
| 5,260,961 | 11/1993 | Zhou et al. | 372/57 |
| 5,301,203 | 4/1994 | Schlie et al. | 372/55 |
| 5,335,245 | 8/1994 | Marie et al. | 372/103 |
| 5,596,596 | 1/1997 | Wakabayashi et al. | 372/57 X |

FOREIGN PATENT DOCUMENTS

| 56-089703 | 7/1981 | Japan | 372/57 X |
| 61-061859 | 4/1986 | Japan | 372/57 X |
| 63-174472 | 11/1988 | Japan | 372/57 X |
| 2-267136 | 10/1990 | Japan | 372/57 X |
| 4-348091 | 12/1992 | Japan | 372/57 X |
| 7-011477 | 3/1995 | Japan | 372/57 X |

*Primary Examiner*—Brian Healy
*Attorney, Agent, or Firm*—Cushman Darby & Cushman Intellectual Property Group of Pillsbury Madison & Sutro LLP

[57] ABSTRACT

An ultraviolet range laser comprising a vacuum vessel having an open end portion hermetically sealed with an output mirror glass substrate, which is featured in that the output mirror glass substrate is formed of a glass material which is capable of allowing a laser beam of 337 nm in wavelength to pass therethrough at a transmittance of 80 to 96% as measured when the thickness of the glass substrate is set to 5 mm and whose thermal expansion coefficient falls in the range of $44 \times 10^{-7}/°C$. to $55 \times 10^{-7}/°C$. at a temperature of 0° C. to 300° C., and in that a metallic sealing ring is hermetically attached to the open end portion of vacuum vessel and the hermetical sealing of the open end portion of vacuum vessel with the output mirror glass substrate is achieved by hermetically adhering the output mirror glass substrate onto the metallic sealing ring via a low melting point solder glass interposed therebetween.

27 Claims, 3 Drawing Sheets

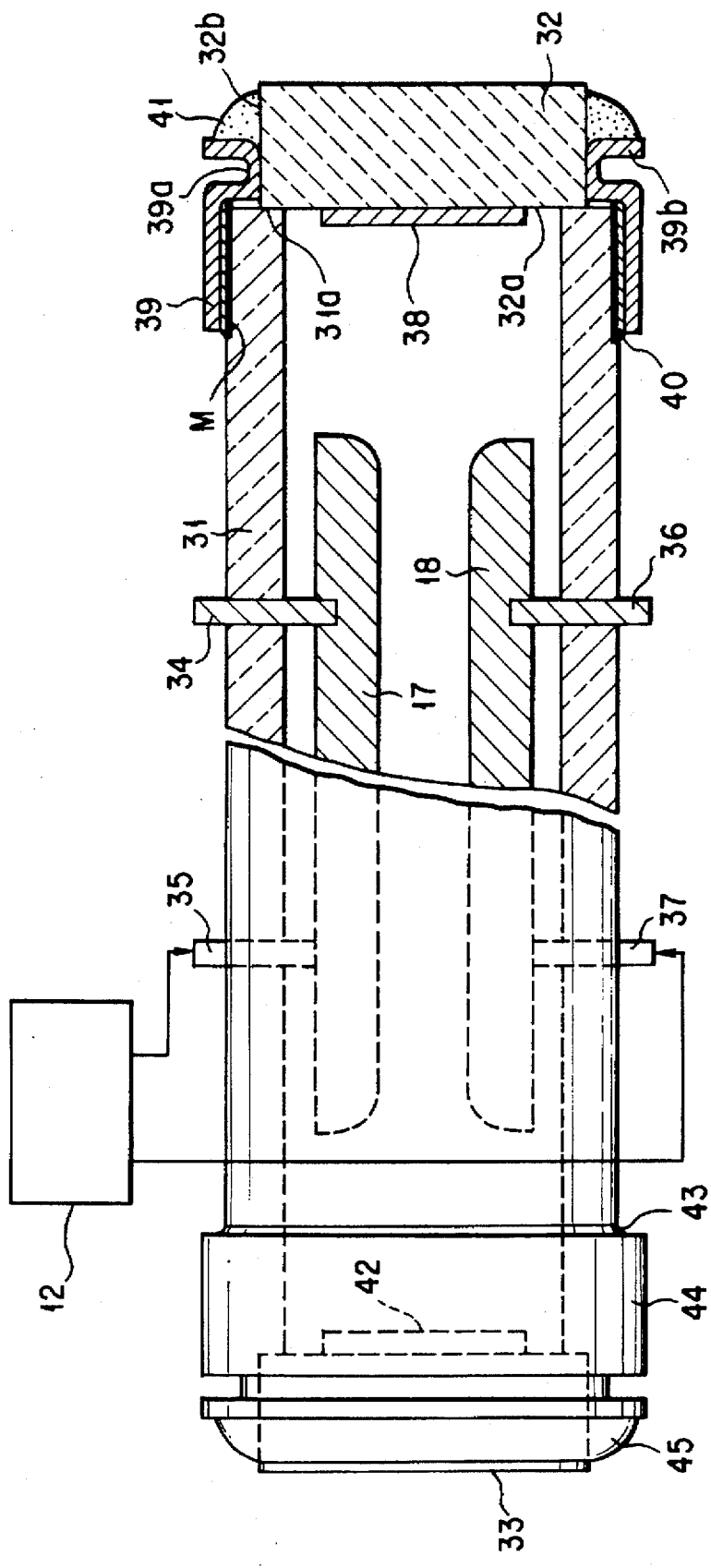
F I G. 3

ULTRAVIOLET RANGE LASER AND METHOD FOR MANUFACTURING THE SAME

CROSS-REFERENCE TO THE RELATED APPLICATIONS

This is a continuation application of Application No. PCT/JP96/00934, filed Apr. 5, 1996, now abandoned.

BACKGROUND OF THE INVENTION

1. Field of the Invention

This invention relates to an ultraviolet range laser such as a nitrogen gas laser or an excimer laser, and also to a method of manufacturing the ultraviolet range laser.

2. Description of the Related Art

An ultraviolet range laser-oscillating apparatus such as a nitrogen gas laser, an excimer laser, etc. is widely utilized in various kinds of chemical experiments and chemical analysis, in the field of biochemistry, or as an excitation light source for a dye laser. For example, the nitrogen gas laser capable of generating a laser beam of ultraviolet range of mainly 337.1 nm in wavelength is featured in that it can be operated as a pulse oscillator and is capable of achieving a high peak output in spite of its relatively simple structure. On the other hand, the excimer laser is well known as an oscillating source of a high output laser beam of 308 nm in wavelength or of other ultraviolet range or vacuum ultraviolet range.

The nitrogen gas laser of ordinary transverse excitation type for example is generally constructed as shown in FIG. 1. Namely, it comprises a nitrogen gas laser tube device 11 and a power source device 12 connected electrically to the nitrogen gas laser tube device 11 for supplying an operating voltage to the nitrogen gas laser tube device 11. The power source device 12 is provided with a high voltage-generator 13 to which a switching device 14 such as a spark gap or a thyratron is connected. The power source device 12 is connected to the nitrogen gas laser tube device 11 via a storage capacitor 15.

The interior of the vacuum vessel of the nitrogen gas laser tube device 11 is filled with nitrogen gas as a laser mediuma at a predetermined pressure, and provided with a pair of discharge electrodes 17 and 18 positioned to face to each other. At the occasion of discharging, one of the discharge electrodes, i.e. the electrode 18 functions as an anode, while the other electrode 17 functions as a cathode, and hence the electrode 18 is defined as being an anode 18, while the electrode 17 is defined as being a cathode 17. Further, between these anode 18 and cathode 17 are connected in parallel a peaking capacitor 22 and a charge resistor 23.

In the operation of the nitrogen gas laser tube device 11 constructed above, a charging from the high voltage-generator 13 to the storage capacitor 15 is performed under a condition where the switching element 14 is kept open. When the switching element 14 is closed after the charging is finished, the electric charge stored in the storage capacitor 15 is transferred to the peaking capacitor 22 via the switching element 14. When the electric charge is transferred in this manner, a pulse of predetermined high voltage is impressed between the anode and the cathode, thus generating a glow discharge. As a result, an optical resonance is caused to generate between a high reflection mirror (not shown) and an output mirror (not shown), thus allowing a laser beam to be emitted from the output mirror.

By the way, the mirror portion constituting the optical resonator of the conventional nitrogen gas laser tube device is constructed as shown in FIG. 2. Namely, a mirror glass substrate 26 having a mirror film 25 deposited thereon is disposed to hermetically seal the open end of the cylindrical vacuum vessel 24 formed of glass or ceramics. On the other hand, the mirror portion (not shown) on the high reflection side is provided with a mirror substrate having a high reflection mirror film adhered thereon, the high reflection mirror film being formed of aluminum or a multi-layered dielectric film so as to reflect 99.5% or more of the laser beam of the oscillating wavelength of nitrogen laser. Since the mirror substrate on the high reflection side is not required to have a capability to allow a laser beam to pass therethrough, the material for the mirror substrate is not so restricted.

On the other hand, the mirror glass substrate 26 on the laser output side is required to be formed of a material which is capable of exhibiting a sufficiently high transmittance of a wavelength of 337.1 nm so as to allow a laser beam of the oscillation wavelength of nitrogen laser, i.e. a wavelength of 337.1 nm to pass through the mirror glass substrate 26 with the minimum possible loss of the laser beam. In view of this requirement, a quartz glass such as a synthetic quartz has been generally employed up to date as a mirror glass substrate on the laser output side. The quartz glass exhibits a transmittance of as high as 85% or more of light having a wavelength of up to nearly 270 nm in the ultraviolet range, and is readily available.

However, the thermal expansion coefficient of the mirror substrate made of quartz glass is about $5.5 \times 10^{-7}/°C.$, whereas the thermal expansion coefficient of alumina ceramics which is generally employed as a vacuum vessel 24 is about $70 \times 10^{-7}/°C.$, i.e. higher than that of the quartz glass by more than ten times. Therefore, it has been difficult to attain a strong and stable hermetical bonding of both mirror substrate and the vacuum vessel in the form of hard seal structure.

Under the circumstances, there has been extensively adopted a structure as shown in FIG. 2 where the bonding between the mirror glass substrate 26 on the output side which is made of quartz glass and the open end portion of the vacuum vessel 24 which is made of alumina ceramics is achieved by making use of an epoxy-based adhesive 27 which is relatively excellent in elasticity. This hermetical bonding is generally called a soft seal.

However, the conventional nitrogen laser of the aforementioned soft seal structure where the hermetical sealing of the mirror glass substrate is effected by making use of an epoxy-based adhesive as explained above is accompanied with a drawback that the hermetical sealing strength is deteriorated with time due to the effect of ambient moisture, resulting in the invasion of the outer air into the vacuum vessel, thus deteriorating the laser output within a relatively short period of time. In particular, the epoxy-based adhesive is generally vulnerable to moisture so that the deterioration in operational reliability of the laser under a humid climate or circumstance would become more conspicuous.

In order to overcome such a problem and to provide a laser which is capable of maintaining the initial condition of filled gas for a long period of time so as to maintain a high reliability of the laser for a long period of time, it is desired to fabricate the hermetic sealing portion of the laser into a structure which is free from any influence of ambient atmosphere, i.e. a hard seal structure. One example of such a structure is disclosed in Japanese Patent Unexamined Publication Hei/4-348091. According to this Publication, Covar (trade name) and Covar glass are hermetically adhered onto a vacuum vessel and quartz glass is further adhered thereover with a glass having an intermediate thermal expansion coefficient interposed therebetween, the mirror glass substrate formed of quartz glass of the same kind as the aforementioned quartz glass being fuse-bonded onto the vacuum vessel via the quartz glass.

However, the construction proposed in this Publication is very complicated, thus making the manufacture thereof very troublesome, hence badly affecting the reliability of the device and at the same time making the device larger in length and diameter.

As for a laser other than the ultraviolet range laser, there is proposed to hermetically bond a metallic part constituting a portion of a vacuum vessel to a mirror glass substrate through a low melting point solder glass as disclosed for example in Japanese Patent Unexamined Publication Shou/ 63-10578 (corresponding to U.S. Pat. No. 4,727,638) or Japanese Utility Model Publication Hei/7-11477. According to the former Publication, a borosilicate glass such as BK-7 (trade name) which is generally useful for an optical device is used for the laser mirror substrate. However, since such a glass substrate for optical use is poor in transmittance as explained below, it is not suited for use as an output side mirror substrate for the ultraviolet range laser for emitting a relatively short wavelength such a nitrogen gas laser.

SUMMARY OF THE INVENTION

Accordingly, an object of the present invention is to provide an ultraviolet range laser which is capable of overcoming the aforementioned problems in the prior art, compact in structure and capable of maintaining a highly reliable operation performance thereof for a long period of time. Another object of the present invention is to provide a method of manufacturing such an ultraviolet range laser.

Namely, according to the present invention, there is provided an ultraviolet range laser comprising a vacuum vessel having an open end portion hermetically sealed with an output mirror glass substrate, which is featured in that the output mirror glass substrate is formed of a glass material which is capable of allowing a laser beam of 337 nm in wavelength to pass therethrough at a transmittance of 80 to 96% as measured when the thickness of the glass substrate is set to 5 mm and whose thermal expansion coefficient falls in the range of $44 \times 10^{-7}/°C$. to $55 \times 10^{-7}/°C$. at a temperature of 0° C. to 300°C., and in that a metallic sealing ring is hermetically attached to the open end portion of vacuum vessel and the hermetical sealing between the open end portion of vacuum vessel and the output mirror glass substrate is achieved by hermetically adhering the output mirror glass substrate onto the metallic sealing ring with a low melting point solder glass interposed therebetween.

According to the present invention, there is further provided a method of manufacturing an ultraviolet range laser comprising the steps of: positioning discharge electrodes in an interior of a cylindrical ceramic vacuum vessel and at the same time hermetically bonding a metallic sealing ring onto an open end portion of the vacuum vessel; press-contacting part of inner surface of a mirror glass substrate having if required a mirror film adhered thereon to the open end face of the vacuum vessel while feeding a low melting point solder glass at an interface between the metallic sealing ring and the mirror glass substrate; baking the low melting point solder glass so as to hermetically adhere the mirror glass substrate onto the metallic sealing ring; and filling the interior of the vacuum vessel with gas constituting a laser medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodi-ments given below, serve to explain the principles of the invention.

FIG. 3 is a partially sectional view of a main portion of a laser according to one embodiment of this invention;

DETAILED DESCRIPTION OF THE PREFERRED EMBODIMENTS

Figure 1:
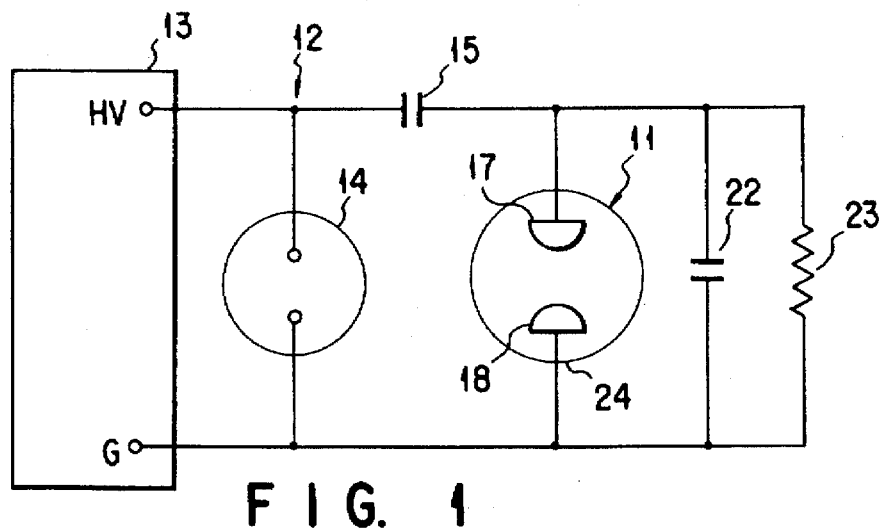
FIG. 1 is a schematic diagram showing the construction of an ordinary nitrogen gas laser.
Figure 2:
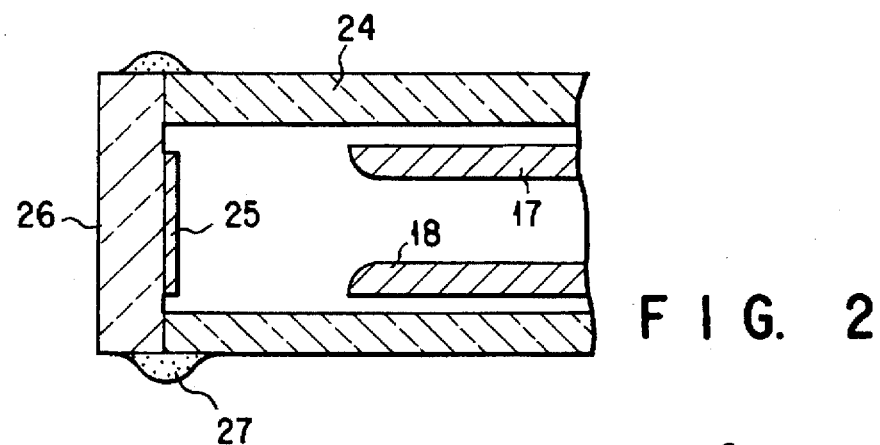
FIG. 2 is a vertical sectional view of a main portion of the conventional laser.

This invention will be explained further with reference to drawings illustrating one embodiment of this invention. Throughout these drawings, the same parts are indicated by the same reference numerals. FIG. 3 shows a nitrogen gas laser which has been accomplished according to this invention. Referring to FIG. 3, the nitrogen gas laser according to this embodiment is provided with an output mirror glass substrate 32 which is hermetically bonded in the form of a hard seal structure to one of the open ends of a cylindrical vacuum vessel 31 formed of alumina ceramics and also with a high reflection mirror glass substrate 33 which is hermetically bonded also in the form of a hard seal structure to the other of the open ends of the cylindrical vacuum vessel 31.

At the middle of the interior of the cylindrical vacuum vessel 31, a pair of main discharge electrodes, i.e. a cathode 17 and an anode 18 both formed of a nickel or brass rod are disposed parallel with the axial direction of the vacuum vessel 31 and in a manner to face to each other with a laser beam path being interposed therebetween. These cathode 17 and an anode 18 are fixed and supported by a pair of supporting rods 34 and 35, and another pair of supporting rods 36 and 37 respectively, these supporting rods 34, 35, 36 and 37 being mounted on the vacuum vessel 31 in such a manner that they are hermetically pierced into the interior of the vacuum vessel 31 through the wall thereof.

An output mirror film 38 is adhered onto the central portion of the inner surface 32a of the output mirror glass substrate 32. The peripheral portion of the output mirror glass substrate 32 is press-contacted with the open end face 31a of the vacuum vessel 31. A substrate-sealing ring 39 made of Covar or an iron/nickel alloy is hermetically soldered by making use of a metallized layer M and a silver solder layer 40 onto the outer peripheral wall of the open end portion of the vacuum vessel 31 so as to maintain the vacuum of the vacuum vessel 31.

The substrate-sealing ring 39 is provided with a top portion slightly extended along the axis thereof from the open end face of the vacuum vessel where a curved portion 39a for alleviating stress is formed at the intermediate portion thereof and a flange portion 39b is formed at the distal end thereof expanding externally from the curved portion 39a. The flange portion 39b is disposed in close to an intermediate portion in thicknesswise of the outer circumferential wall 32b of the output mirror glass substrate 32. The inner diameter of the curved portion 39a of the substrate sealing ring is made equal to or slightly larger than the outer diameter of the glass substrate 32. Therefore, the mirror film can be easily and precisely aligned with the axis of the laser beam path at the occasion of inserting the glass substrate 32 into the substrate sealing ring so as to press-contact it with the open end face 31a of the vacuum vessel, and at the same time it is possible to prevent a solder glass material from unwillingly flowing into the interface between the inner surface 32a of the glass substrate and open end face 31a of the vacuum vessel at the baking step of a low melting point solder glass to be explained below.

The outer circumferential wall 32b of the output mirror glass substrate 32 is hermetically adhered onto the flange portion 39b of the substrate-sealing ring by making use of a low melting point solder glass 41 deposited covering both circumferential wall 32b and the flange portion 39b thereby vacuum-sealing the vacuum vessel. Likewise, the mirror glass substrate 33 disposed on the high reflection side and having a high reflection mirror film 42 attached thereto is adhered onto the vacuum vessel 31 by making use of a metallic sealing ring 44 which is hermetically bonded to the outer circumference of the open end portion of the vacuum vessel via a metallized layer and a silver solder layer 43 as well as by making use of a low melting point solder glass 45 so as to maintain the vacuum of the vacuum vessel. The interior of the vacuum vessel is filled with nitrogen gas of predetermined pressure, the nitrogen gas constituting a laser medium. The vacuum vessel is connected with a power source device 12 for supplying a pulse voltage to the cathode and anode. These components are accommodated in a case (not shown) thereby accomplishing a laser oscillation apparatus.

Next, preferred procedures of manufacturing this laser tube apparatus will be explained.

Figure 4:
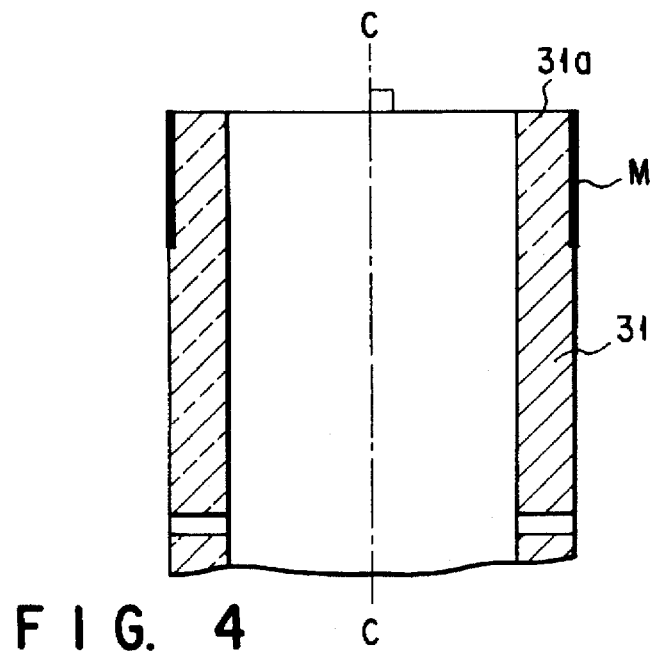
FIG. 4 is a vertical sectional view illustrating a manufacturing step of a laser shown in FIG. 3.

First of all, as shown in FIG. 4, the metallized layer M is deposited at a soldering area of the outer peripheral wall of the open end portion of the vacuum vessel 31 made of alumina ceramics. The deposition of the metallized layer M can be carried out by coating a slurry mainly comprising molybdenum powder and manganese powder dissolved in advance in a solvent and, after being baked, the baked layer is covered by a nickel plating layer.

Subsequently, the open end face 31a of the vacuum vessel is surface-finished by polishing the open end face 31a in a direction perpendicular to the central axis, i.e. the axis C of the laser beam path. With this surface finishing, any portion of the metallized layer that might be protruded up to the open end face 31a may be erased away.

Figure 5:
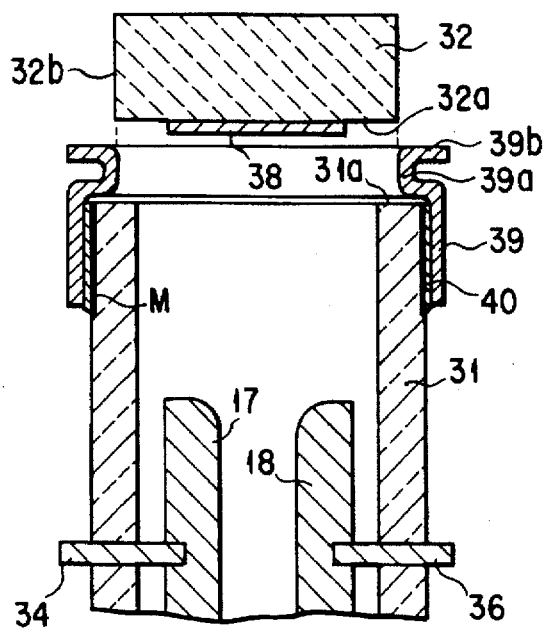
FIG. 5 is a vertical sectional view illustrating a manufacturing step of a laser following the step shown in FIG. 4.

Then, as shown in FIG. 5, the substrate sealing ring 39 and the silver solder are placed in the region of the metallized layer on the outer peripheral wall of the open end portion of the vacuum vessel 31, and thereafter hermetically soldered by heating them at a temperature of about 780° C. Concurrently with this soldering step, each of the electrode-supporting rods bearing in advance the cathode 17 or anode 18, and an exhaust tube (not shown) are hermetically soldered onto predetermined portions of the vacuum vessel. Since this soldering step of each metallic component onto the vacuum vessel is performed by heating a solder up to such a high temperature which may cause the mirror glass substrate and the mirror film deposited on the surface of the mirror glass substrate to become denatured, the soldering step is performed before mounting the mirror glass substrate on the vacuum vessel, i.e. in a condition where only the vacuum vessel can be heated.

Figure 6:
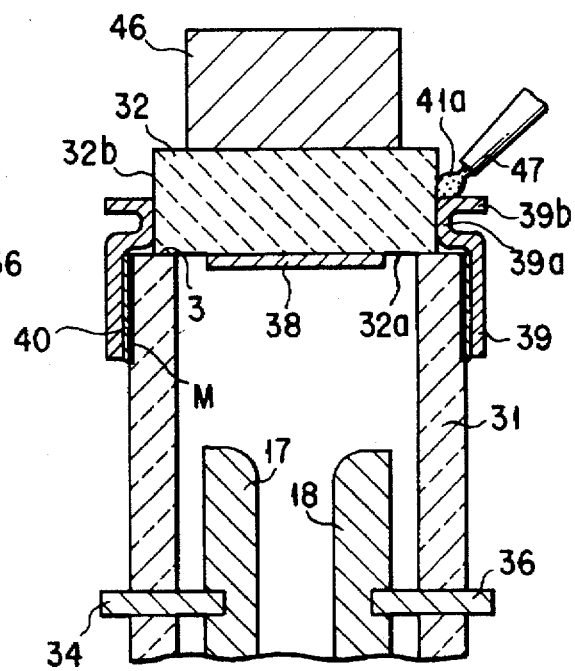
FIG. 6 is a vertical sectional view illustrating a manufacturing step of a laser following the step shown in FIG. 5.

Meanwhile, the output mirror film 38 formed of a dielectric multi-layered film is vapor-deposited in advance on one main surface of the output mirror glass substrate 32 which is made of a material to be explained hereinafter and shaped into a disk form. Thereafter, as shown in FIG. 6, the vacuum vessel 31 is placed with its central axis directed perpendicularly and then the mirror glass substrate 32 is inserted into the flange 39b of the substrate-sealing ring. In this step, the glass substrate 32 is just fitted in the inside of the curved portion 39b of the sealing ring so that the glass substrate 32 can be precisely positioned in place. As a result, the peripheral portion surrounding the mirror film on the inner surface of the glass substrate 32 is press-contacted with the inner circumference portion of the open end face 31a of the vacuum vessel, and then a heat resistant weight 46 is placed on the glass substrate so as to keep this pressed condition. It is of course possible to make use of a suitable fixing tool and an elastic member in place of employing the aforementioned weight for keeping this press contact condition.

As for the high reflection mirror side not shown in figures, the mirror substrate is brought into contact with the vacuum vessel and placed in position. With respect to the material for the mirror substrate on the high reflection mirror side, any material such as a metallic material can be used. It is however preferred to employ the same material as that of the output mirror glass substrate 32 in view of accomplishing the hermetical sealing of the vacuum vessel with both mirror substrates in one sealing step as well as in view of achieving a sealing of high reliability.

Subsequently, a slurry of a low melting point solder glass material 41a which is prepared by dissolving the low melting point solder glass material in a suitable solvent is applied in a suitable amount to the corner portion where the outer peripheral wall of the mirror glass substrate 32 is closely contacted with the flange portion 39b of the substrate-sealing ring by making use of a nozzle 47 of a coating apparatus. The slurry thus coated is allowed to be temporarily solidified by drying it. Likewise, the low melting point solder glass is applied to the high reflection mirror side.

Subsequently, the vacuum vessel under this condition is introduced into a heating furnace for sealing, and the temperature of the furnace is gradually raised up to for example 460° C. which is the baking temperature of the low melting point solder glass and then this temperature is maintained for a predetermined period of time after which the temperature of the furnace is gradually cooled down. As a result, the low melting point solder glass is baked, i.e. solidified after being fused, thus achieving a hermetical and strong sealing of the interface between the outer peripheral wall 32b of the mirror glass substrate and the flange portion 39b of the substrate-sealing ring. By the way, the heating temperature in this sealing step is controlled such that the mirror glass substrate and the mirror film consisting of a dielectric multi-layered film would not be or not substantially be denatured.

After being fabricated in this manner, the interior of the vacuum vessel is exhausted through an exhaust tube (not shown), or the vacuum vessel and electrodes inside the vacuum vessel are heated to a suitable temperature so as to release any gas remained therein thereby exhausting the vacuum vessel. Subsequently, nitrogen gas is introduced into the vacuum vessel through the exhaust tube so as to fill the vacuum vessel with a predetermined pressure of nitrogen gas, and then the exhaust tube is cut and sealed. Thereafter, the vacuum vessel is accommodated in a case together with a power source if required, thereby accomplishing the nitrogen laser as shown in FIG. 3.

The output mirror glass substrate 32 is formed of a glass material which is capable of allowing a laser beam of 337 nm in wavelength to pass therethrough at a transmittance of 80 to 96% as measured when the thickness of the glass substrate is set to 5 mm, and whose thermal expansion coefficient is in the range of $44 \times 10^{-7}/°C$. to $55 \times 10^{-7}/°C$. at a temperature of 0° C. to 300° C. More preferably, the output mirror glass substrate 32 should be formed of a glass material which is capable of allowing a laser beam of 337 nm in wavelength to pass therethrough at a transmittance of 85 to 94% as measured when the thickness of the glass substrate is set to 5 mm. Suitable examples of such a glass substrate include borosilicate glass, which may be available for example from Toshiba Glass Co. as a Material Code 084 Glass (trade name: FP-3) or from Corning Co. as a Material Code CGW-7056.

Figure 7:
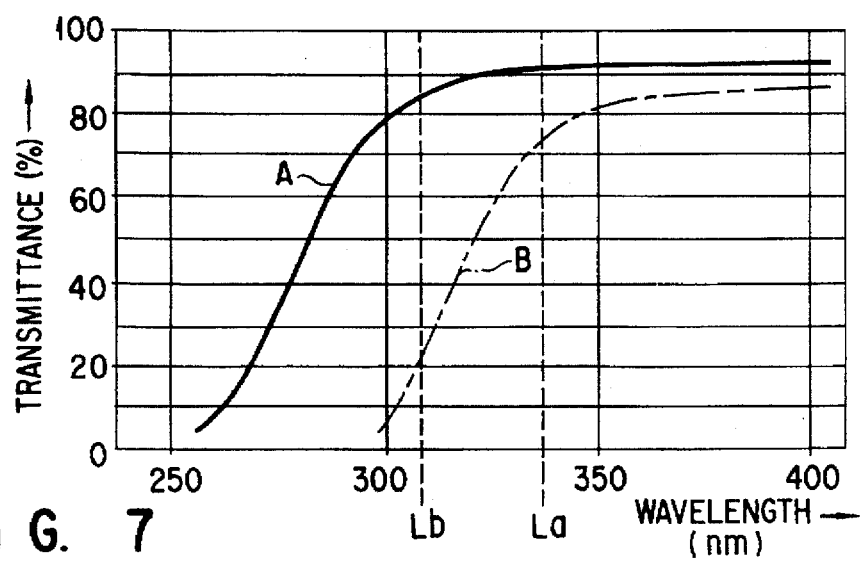
FIG. 7 is a graph showing a spectral transmittance of a glass substrate.

The Material Code 084 Glass has a thermal expansion coefficient of about $52 \times 10^{-7}/°C$., and the spectral transmittance at the ultraviolet range thereof was found to be as shown by the solid line A in FIG. 7. The sample measured in this case had a thickness of 5 mm and was not subjected to any kind of thermal chemical treatment or coating treatment. This sample allowed a laser beam of 337.1 nm which is an output wavelength (La) of the nitrogen laser to pass therethrough at a transmittance of 92%, and a laser beam of 308 nm which is a wavelength (Lb) of the $Xe_2Cl$ excimer laser to pass therethrough at a transmittance of 85%. By contrast, the borosilicate glass BK-7 which is known as being suited for use in soldering or fusing it with Covar was found to be as shown by the dot and dash line B in FIG. 7. This borosilicate glass BK-7 allowed a laser beam of 337.1 nm to pass therethrough at a transmittance of 73%, and a laser beam of 308 nm to pass therethrough at a transmittance of as small as 22%, so that it would be impossible to employ such a borosilicate glass in an ultraviolet range laser.

The output mirror glass substrate which is suited for use in an ultraviolet range excimer laser is formed of a glass material which is capable of allowing a laser beam of 308 nm in wavelength to pass therethrough at a transmittance of 75 to 92% as measured when the thickness of the glass substrate is set to 5 mm, and whose thermal expansion coefficient is in the range of $44 \times 10^{-7}/°C$. to $55 \times 10^{7}/°C$. at a temperature of 0° C. to 300° C. More preferably, the output mirror glass substrate should be formed of a glass material which is capable of allowing a laser beam of 308 nm in wavelength to pass therethrough at a transmittance of 80 to 90% as measured when the thickness of the glass substrate is set to 5 mm.

It has been found as a result of extensive studies by the present inventors that a borosilicate glass comprising 65.0 to 70.0% of $SiO_2$, 2.0 to 8.0% of $Al_2O_3$, 6.0 to 10.0% of $K_2O$, 0.5 to 1.5% of $Li_2O$, 15.0 to 22.0% of $B_2O$, and not more than 2.0% in total of other elements in a relative mass ratio is suited for a practical use as a material for the output mirror glass substrate.

As for the output mirror film 38, a dielectric multi-layered film comprising silicon oxide and hafnium oxide, and exhibiting 10 to 50%, preferably 20 to 40% in reflectance to the laser beam of 337 nm in wavelength is desirable. In the case of a pulse laser of such an ultraviolet range, the output mirror film may be omitted provided that the reflectance at both surfaces of the glass substrate itself is about 10% or more.

As for the material for the low melting point solder glass and the substrate-sealing ring to be soldered to the vacuum vessel, those having a thermal expansion coefficient falling in the range of $44 \times 10^{-7}/°C$. to $55 \times 10^{-7}/°C$. at a temperature of 0° C. to 300° C. are suited. Examples of such a low melting point solder glass include a product from Nihon Denki Glass Co., Material Code LS-0111, which is a powdered glass for electronic parts. This powdered glass may be employed by transforming it into a slurry by dissolving it in a solvent comprising mainly acetic acid, the slurry being subsequently coated and heated to a baking temperature thereby achieving the fuse-bonding thereof. The heating of the slurry should preferably be performed for obtaining an excellent hermetical bonding under the conditions that the slurry is first heated up to the baking temperature of 460° C. at an increment of about 10° C. per minute, and then gradually cooled down. The thermal expansion coefficient of the aforementioned Material Code LS-0111 which is a low melting point solder glass is $50 \times 10^{-7}/°C$. at a temperature of 0° C. to 300° C. The material for the substrate-sealing metal ring should be selected from materials which exhibit an excellent soldering property in relative to Covar or ceramics such as alumina, and, if required, may be provided with a strain-absorptive portion such as a thin wall portion or a curved portion. By the way, the Covar has a thermal expansion coefficient ranging from $45 \times 10^{-7}/°C$. to $52 \times 10^{-7}/°C$., for example $50 \times 10^{-7}/°C$. at a temperature of 0° C. to 300° C.

When the glass substrate, the low melting point solder glass and the substrate-sealing ring, each formed of the aforementioned materials, are employed, it is possible to achieve an excellent hermetical sealing which is free from strain and highly reliable, because the thermal expansion coefficient as well as the shrinkage factor of these materials at each temperatureraising or lowering process during the sealing step using a low melting point solder glass are very close to each other.

In the above example, the surface of the output mirror glass substrate where the mirror film is adhered is in direct contact with the open end face of the vacuum vessel. However, the surface of the output mirror glass substrate may be in indirect contact with the open end face of the vacuum vessel with a spacer ring interposed therebetween. The vacuum vessel and the substrate-sealing ring may be hermetically bonded together by making use of the aforementioned low melting point solder glass in stead of using a solder.

According to the above example, since the sealing portion of the vacuum vessel constituting the laser is hermetically sealed by making use of an inorganic solder glass, there is substantially no possibility that the vacuum sealing of the vacuum vessel would be deteriorated under the ordinary working environment. Furthermore, since the hermetical sealing is achieved with the use of materials which are very close in thermal expansion coefficient to each other, it is possible to carry out the exhaustion of the laser, i.e. the exhaustion of the laser while baking the laser at a relatively high temperature before a laser medium is introduced into the vacuum vessel. As a result, any impurity gases or other impurities adhered on or included in the inner wall or electrodes inside the laser can be sufficiently removed by this exhaustion under a high temperature baking. Therefore, it is possible, even if the temperature of the inner wall or inner electrodes of the laser are raised during the discharging operation, to inhibit the deterioration of laser output than might be caused by the release of impurity gases or other impurities.

Moreover, since the bonding structure is relatively simple, the number of parts to be used can be minimized and at the same time any parts which might be a cause of increasing the length or diameter of the vacuum vessel can be dispensed with, thereby making it possible to make a laser into a compact structure. It is also possible according to this invention to maintain the initial state or condition of the laser medium filled in the vacuum vessel for a long period of time. Moreover, according to this invention, since the transmittance of the mirror substrate to the output laser beam is sufficiently high and the denaturing of the mirror film would be hardly brought about, it is possible to obtain an ultraviolet range laser which is free from any deterioration of laser output for a long period of time and excellent in reliability.

In the above example, a pulse laser of lateral discharge excitation type is explained. However, the discharge type of the laser is not limited to that of the above example, but this invention can be also applied for example to an ultraviolet range laser of horizontal discharge excitation type where the laser oscillation is effected coaxial with the discharge direction.

As explained above, it is possible according to this invention to obtain an ultraviolet range laser which is compact in structure and capable of maintaining highly reliable operational properties for a long period of time.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. An ultraviolet range laser comprising a cylindrical ceramic vacuum vessel, at least one pair of discharge electrodes positioned in said vacuum vessel, a high reflection mirror substrate hermetically bonded onto one open end of said vacuum vessel, an output mirror glass substrate hermetically bonded onto the other open end of said vacuum vessel, a laser medium filled in said vacuum vessel, characterized in that said output mirror glass substrate is formed of a glass material which is capable of allowing a laser beam of 337 nm in wavelength to pass therethrough at a transmittance of 80 to 96% as measured when the thickness of said output mirror glass substrate is set to 5 mm and whose thermal expansion coefficient falls within the range of $44 \times 10^{-7}/°C$ to $55 \times 10^{-7}/°C$ at a temperature of 0° C. to 300°C., and in that a metallic sealing ring is hermetically attached to each of said open ends of vacuum vessel and the hermetical sealing of said open end of vacuum vessel with said output mirror glass substrate is achieved by hermetically adhering said output mirror glass substrate onto said metallic sealing ring via a low melting point solder glass interposed therebetween.

2. The ultraviolet range laser according to claim 1, wherein said output mirror glass substrate is formed of a glass material which is capable of allowing a laser beam of 337 nm in wavelength to pass therethrough at a transmittance of 85 to 94% as measured when the thickness of said output mirror glass substrate is set to 5 mm.

3. The ultraviolet range laser according to claim 1, wherein said output mirror glass substrate is formed of a borosilicate glass.

4. The ultraviolet range laser according to claim 1, wherein said output mirror glass substrate is formed of a borosilicate glass comprising components (1) to (6) at a relative mass ratio:

(1) 65.0 to 70.0% of $SiO_2$;

(2) 2.0 to 8.0% of $Al_2O_3$;

(3) 6.0 to 10.0% of $K_2O$;

(4) 0.5 to 1.5% of $Li_2O$;

(5) 15.0 to 22.0% of $B_2O$; and (6) not more than 2.0% in total of other elements.

5. The ultraviolet range laser according to claim 1, wherein said output mirror glass substrate is provided on its inner surface with an output mirror film which is formed of a dielectric multi-layered film comprising silicon oxide and hafnium oxide.

6. The ultraviolet range laser according to claim 1, wherein said output mirror glass substrate is provided on its inner surface with an output mirror film exhibiting 10 to 50% in reflectance to the laser beam of 337 nm in wavelength.

7. The ultraviolet range laser according to claim 1, wherein said output mirror glass substrate is provided on its inner surface with an output mirror film exhibiting 20 to 40% in reflectance to the laser beam of 337 nm in wavelength.

8. The ultraviolet range laser according to claim 1, wherein part of inner surface of said output mirror glass substrate is press-contacted to an open end face of said vacuum vessel directly or indirectly with a spacer interposed therebetween.

9. The ultraviolet range laser according to claim 8, wherein said open end face of the vacuum vessel is surface-finished in a direction perpendicular to an axis of laser beam path.

10. The ultraviolet range laser according to claim 1, wherein both said metallic sealing ring and low melting point solder glass have a thermal expansion coefficient falling in the range of $44 \times 10^{-7}/°C$ to $55 \times 10^{-7}/°C$ at a temperature of 0° C. to 300°C.

11. The ultraviolet range laser according to claim 1, wherein a power source device for supplying an operation voltage of pulse shape is connected to said discharge electrodes.

12. An ultraviolet range laser comprising a cylindrical ceramic vacuum vessel, a pair of discharge electrodes positioned in said vacuum vessel, a high reflection mirror substrate hermetically bonded onto one open end of said vacuum vessel, an output mirror glass substrate hermetically bonded onto the other open end of said vacuum vessel, a laser medium filled in said vacuum vessel characterized in that said output mirror glass substrate is formed of a glass material which is capable of allowing a laser beam of 308 nm in wavelength to pass therethrough at a transmittance of 75 to 92% as measured when the thickness of said output mirror glass substrate is set to 5 mm and whose thermal expansion coefficient falls within the range of $44 \times 10^{-7}/°C$ to $55 \times 10^{-7}/°C$ at a temperature of 0° C. to 300°C., and in that a metallic sealing ring is hermetically attached to each of said open ends of vacuum vessel and the hermetical sealing of said open end of vacuum vessel with said output mirror glass substrate is achieved by hermetically adhering said output mirror glass substrate onto said metallic sealing ring via a low melting point solder glass interposed therebetween.

13. The ultraviolet range laser according to claim 12, wherein said output mirror glass substrate is formed of a glass material which is capable of allowing a laser beam of 308 nm in wavelength to pass therethrough at a transmittance of 80 to 90% as measured when the thickness of said output mirror glass substrate is set to 5 mm.

14. The ultraviolet range laser according to claim 12, wherein said output mirror glass substrate is formed of a borosilicate glass.

15. The ultraviolet range laser according to claim 12, wherein said output mirror glass substrate is formed of a borosilicate glass comprising components (1) to (6) at a relative mass ratio:

(1) 65.0 to 70.0% of $SiO_2$;
(2) 2.0 to 8.0% of $Al_2O_3$;
(3) 6.0 to 10.0% of $K_2O$;
(4) 0.5 to 1.5% of $Li_2O$;
(5) 15.0 to 22.0% of $B_2O$; and
(6) not more than 2.0% in total of other elements.

16. The ultraviolet range laser according to claim 12, wherein said output mirror glass substrate is provided on its inner surface with an output mirror film which is formed of a dielectric multi-layered film comprising silicon oxide and hafnium oxide.

17. The ultraviolet range laser according to claim 12, wherein said output mirror glass substrate is provided on its inner surface with an output mirror film exhibiting 10 to 50% in reflectance to the laser beam of 337 nm in wavelength.

18. The ultraviolet range laser according to claim 12, wherein said output mirror glass substrate is provided on its inner surface with an output mirror film exhibiting 20 to 40% in reflectance to the laser beam of 337 nm in wavelength.

19. The ultraviolet range laser according to claim 12, wherein part of inner surface of said output mirror glass substrate is press-contacted to an open end face of said vacuum vessel directly or indirectly with a spacer interposed therebetween.

20. The ultraviolet range laser according to claim 19, wherein said open end face of the vacuum vessel is surface-finished in a direction perpendicular to an axis of laser beam path.

21. The ultraviolet range laser according to claim 12, wherein both said metallic sealing ring and low melting point solder glass have a thermal expansion coefficient falling in the range of $44 \times 10^{-7}/°C$ to $55 \times 10^{-7}/°C$ at a temperature of 0°C to 300°C.

22. The ultraviolet range laser according to claim 12, wherein a power source device for supplying an operation voltage of pulse shape is connected to said discharge electrodes.

23. A method of manufacturing an ultraviolet range laser comprising the steps of: positioning at least one pair of discharge electrodes in an interior of a cylindrical ceramic vacuum vessel and at the same time hermetically bonding a metallic sealing ring onto an open end portion of said vacuum vessel; press-contacting part of one surface of a mirror glass substrate directly or via a spacer to said open end face of said vacuum vessel while feeding a low melting point solder glass at an interface between said metallic sealing ring and said mirror glass substrate; baking the low melting point solder glass so as to hermetically adhere said mirror glass substrate onto said metallic sealing ring; and filling the interior of said vacuum vessel with a laser medium.

24. The method of manufacturing an ultraviolet range laser according to claim 23, wherein said open end face of the vacuum vessel is surface-finished in a direction perpendicular to an axis of laser beam path.

25. The method of manufacturing an ultraviolet range laser according to claim 23, wherein a mirror film is adhered in advance on said inner surface of said mirror glass substrate.

26. A method of manufacturing an ultraviolet range laser comprising the steps of: forming a metallized layer for soldering on an outer peripheral wall of an open end portion of a cylindrical ceramic vacuum vessel; surface-finishing an open end face of said vacuum vessel in a direction perpendicular to an axis of laser beam path; positioning discharge electrodes in an interior of said vacuum vessel and at the same time hermetically bonding a metallic sealing ring onto an open end portion of said vacuum vessel; press-contacting part of inner surface of a mirror glass substrate directly or via a spacer to said open end face of said vacuum vessel while feeding a low melting point solder glass at an interface between said metallic sealing ring and said mirror glass substrate; baking the low melting point solder glass so as to hermetically adhere said mirror glass substrate onto said metallic sealing ring; and filling the interior of said vacuum vessel with a laser medium.

27. The method of manufacturing an ultraviolet range laser accordint to claim 26, wherein a mirror film is adhered in advance on said inner surface of said mirror glass substrate.

\* \* \* \* \*